(12) United States Patent  
Kihara

(10) Patent No.: US 8,393,758 B2  
(45) Date of Patent: Mar. 12, 2013

(54) LASER LIGHT SOURCE DEVICE

(75) Inventor: Takashi Kihara, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 429 days.

(21) Appl. No.: 12/753,045

(22) Filed: Apr. 1, 2010

(65) Prior Publication Data  
US 2010/0265714 A1 Oct. 21, 2010

(30) Foreign Application Priority Data

Apr. 16, 2009 (JP) ................................. 2009-099790  
Apr. 16, 2009 (JP) ................................. 2009-099791

(51) Int. Cl.  
G02B 27/20 (2006.01)

(52) U.S. Cl. ........................................ 362/259; 362/339

(58) Field of Classification Search .................. 362/259, 362/339, 319  
See application file for complete search history.

(56) References Cited

U.S. PATENT DOCUMENTS 5,056,891 A * 10/1991 Masunaga ..................... 359/813  
2001/0025425 A1* 10/2001 Haijima et al. ................. 33/281  
2008/0110037 A1* 5/2008 Hayase et al. ................... 33/290

FOREIGN PATENT DOCUMENTS

| JP | 10-133279 | 5/1998 |
|----|-----------|--------|
| JP | 2002-174785 | 6/2002 |
| JP | 2007-300009 | 11/2007 |

* cited by examiner

Primary Examiner — Mariceli Santiago  
Assistant Examiner — Glenn Zimmerman  
(74) Attorney, Agent, or Firm — Beyer Law Group LLP

(57) ABSTRACT

A laser light source device includes a light source unit that emits laser light, an optical axis adjusting unit that adjusts an optical axis of the laser light, and a mounting member on which the optical axis adjusting unit is mounted. The optical axis adjusting unit includes an adjustment mechanism for adjusting the positions of a lens in X- and Y-axis directions. The adjustment mechanism includes an X-axis moving part that is movable in the X-axis direction, a Y-axis moving part that is moved together with the X-axis moving part in the Y-axis direction, X-axis adjusting means that is provided at the X-axis moving part and adjusts the position of the lens in the X-axis direction, and Y-axis adjusting means that is provided at the Y-axis moving part and adjusts the position of the lens in the Y-axis direction.

11 Claims, 8 Drawing Sheets

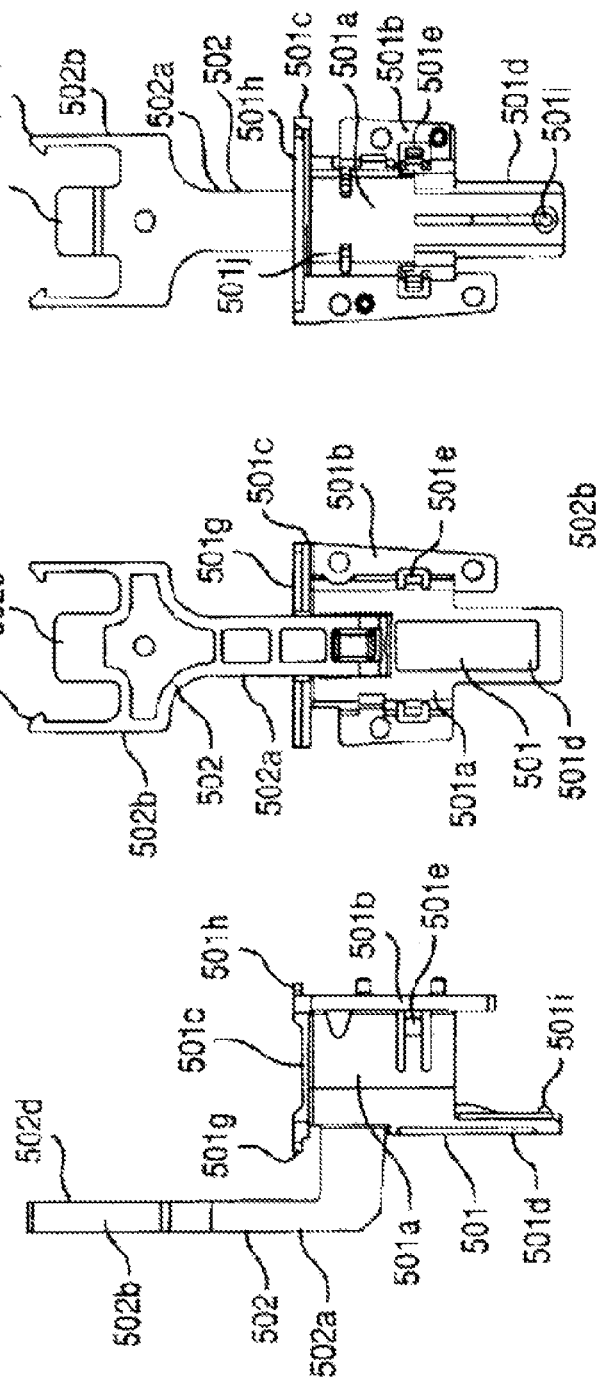

LASER LIGHT SOURCE DEVICE

CROSS REFERENCE TO RELATED APPLICATION

The present invention contains subject matter related to Japanese Patent Application No. 2009-099790 filed in the Japanese Patent Office on Apr. 16, 2009 and Japanese Application No. 2009-099791 filed in the Japanese Patent Office on Apr. 16, 2009, the entire contents of which are incorporated herein by reference.

BACKGROUND

1. Technical Field

The present invention relates to a laser light source device, and more particularly, to a laser light source device of which the optical axis of laser light can be adjusted.

2. Related Art

There is a laser display system (for example, see Japanese Unexamined Patent Application Publication No. 2007-300009). The laser display system includes red, green, and blue laser devices that emit red, green, and blue laser light, respectively, generates a single light beam by combining the color light corresponding to the respective colors, and projects the generated single light beam onto a screen through a laser control system. In the laser display system, an optical axis adjustment mechanism, which finely adjusts an optical axis of the laser light, is required in the laser light source device.

In the past, various optical axis adjustment mechanisms have been proposed in order to efficiently adjust an optical axis (for example, see Japanese Unexamined Patent Application Publication No. 10-133279). In Japanese Unexamined Patent Application Publication No. 10-133279, there is disclosed a liquid crystal panel supporting mechanism that can adjust the optical axis in X- and Y-axis directions orthogonal to each other. The liquid crystal panel supporting mechanism applies pushing forces for pushing an X-axis support plate (an object to be adjusted in the X-axis direction) and a Y-axis support plate (an object to be adjusted in the Y-axis direction) in the X- and Y-axis directions by rod-like springs and adjusts the positions of the X-axis support plate and the Y-axis support plate by rotating screws for X- and Y-axis adjustment.

Further, there is proposed a light beam adjustment mechanism that facilitates the adjustment of a light beam in a multi-beam scanner (for example, see Japanese Unexamined Patent Application Publication No. 2002-174785). The multibeam scanner disclosed in Japanese Unexamined Patent Application Publication No. 2002-174785 focuses a light beam, which is emitted from a light source part, onto a plane to be scanned by a scanning imaging optical system, and performs light scanning on the scanning lines of the plane to be scanned. Further, a prism, which does not have an imaging function, is disposed on a light path of the light beam, and the position and/or direction of the light beam passing through the prism are adjusted by changing the spatial state of the prism. Furthermore, there is disclosed the structure that can change the spatial state of the prism by the motor drive using a gear mechanism.

Meanwhile, if an optical axis adjustment mechanism disclosed in Japanese Unexamined Patent Application Publication No. 10-133279 is applied to the laser light source device of Japanese Unexamined Patent Application Publication No. 2007-300009, it may be possible to adjust an optical axis in X- and Y-axis directions simply by rotating screws for the X-axis adjustment and Y-axis adjustment. However, pushing members (rod-like springs) for applying pushing forces in advance to members (an X-axis support plate and a Y-axis support plate), which are objects to be adjusted, need to be disposed in the optical axis adjustment mechanism disclosed in Japanese Unexamined Patent Application Publication No. 10-133279. For this reason, there is a problem in that the structure of the optical axis adjustment mechanism is complicated.

Further, in the laser light source device, a light beam adjustment mechanism disclosed in Japanese Unexamined Patent Application Publication No. 2002-174785 is applied as an adjustment mechanism that adjusts the direction of laser light, and the prism needs to be appropriately disposed at a predetermined position on a prism holder driven by the gear mechanism when the prism, which adjusts the position and/or direction of a light beam, is interlocked with the gear mechanism. However, the shape of the prism is not necessarily constant and variation may be caused by the manufacturing conditions. For this reason, it was necessary to fix the prism to a predetermined position of the prism holder by an adhesive in order to dispose the prism at a predetermined position of the prism holder. An operation for applying an adhesive to the prism or the prism holder, an operation for pressing the prism against the prism holder while positioning the prism at a predetermined position, and the like are needed in order to fix the prism to a predetermined position of the prism holder by an adhesive. For this reason, there is a problem in that an operation for maintaining the prism at the prism holder becomes complicated.

SUMMARY

An advantage of some aspects of the invention is to provide a laser light source device that can adjust an optical axis or the disposition of a prism without the need for a complicated structure.

According to an aspect of the invention, a laser light source device includes a light source unit that emits laser light, an optical axis adjusting unit that adjusts an optical axis of the laser light emitted from the light source unit, and a mounting member on which the optical axis adjusting unit is mounted. The optical axis adjusting unit includes an adjustment mechanism for adjusting the positions of a lens, which is disposed on a light path, in X- and Y-axis directions that are orthogonal to each other in a plane orthogonal to the optical axis. The adjustment mechanism includes an X-axis moving part that is movable in the X-axis direction, a Y-axis moving part that is moved together with the X-axis moving part as a single body and is movable in the Y-axis direction, X-axis adjusting means that is provided at the X-axis moving part and adjusts the position of the lens in the X-axis direction by coming into elastic contact with a part of the mounting member so as to lock the X-axis moving part, and Y-axis adjusting means that is provided at the Y-axis moving part and adjusts the position of the lens in the Y-axis direction by coming into elastic contact with a part of the X-axis moving part so as to lock the Y-axis moving part.

According to the laser light source device, the X-axis adjusting means and the Y-axis adjusting means, which can adjust the positions of the lens and lock the positions of the X-axis moving part and the Y-axis moving part, are formed at the X-axis moving part and the Y-axis moving part. Accordingly, it may be possible to adjust the positions of the lens by the X-axis moving part and the Y-axis moving part and to hold the lens of which the positions have been adjusted. Therefore, it may be possible to adjust an optical axis without the need for a complicated structure.

In the laser light source device, the X-axis moving part may be moved along a guide portion that is formed at the mounting member, and the Y-axis moving part may be moved along guide portions that are formed at the X-axis moving part. In this case, since it may be possible to stabilize the moving paths of the X-axis moving part and the Y-axis moving part, it is easy to specify the elastic contact positions with which the X-axis adjusting means and the Y-axis adjusting means come into elastic contact, and it may be possible to appropriately lock the X-axis moving part and the Y-axis moving part to the mounting member and the X-axis moving part.

In the Y-axis adjusting means, the Y-axis moving part may include an elastic contact member that is formed of a contact portion coming into contact with a part of the X-axis moving part and a curved portion continuing from the contact portion, and come into elastic contact with a protruding piece of the X-axis moving part that protrudes toward the Y-axis moving part.

Further, in the laser light source device, in the Y-axis adjusting means, the Y-axis moving part may include an elastic contact member that is formed of a contact portion coming into contact with a part of the X-axis moving part and a curved portion continuing from the contact portion, and comes into elastic contact with the protruding piece of the X-axis moving part that protrudes toward the Y-axis moving part. In this case, it may be possible to adjust the position of the lens in the Y-axis direction and lock the Y-axis moving part to the X-axis moving part by a simple structure, that is, the elastic contact member that is formed of the contact portion coming into contact with a part of the X-axis moving part and the curved portion continuing from the contact portion, and the protruding piece that is formed at the X-axis moving part.

Furthermore, in the laser light source device, after the positions of the lens are adjusted by the X-axis adjusting means and the Y-axis adjusting means, the X-axis moving part may be bonded and fixed to the mounting member and the Y-axis moving part may be bonded and fixed to the X-axis moving part. In this case, the X-axis moving part and the Y-axis moving part are bonded and fixed to the mounting member and the X-axis moving part after the adjustment of the positions of the lens, respectively. Accordingly, it may be possible to reliably hold the positions of the lens of which the positions have been adjusted.

Moreover, in the laser light source device, the mounting member on which the optical axis adjusting unit has been mounted may be mounted on a base member to which the light source unit is fixed. In this case, since the optical axis adjusting unit is mounted on the base member through the mounting member, an operation for directly mounting the optical axis adjusting unit, which includes an adjustment mechanism movable in the X- and Y-axis directions, on the base member does not need to be performed. Accordingly, it may be possible to improve the working efficiency in assembling the laser light source device.

In addition, the laser light source device may further include a light source irradiation unit that includes a prism disposed on a light path of the laser light passing through the optical axis adjusting unit and a prism holder for holding the prism, and the prism holder may be pressed toward the base member by a part of the mounting member. In this case, the mounting member may have a function to hold the optical axis adjusting unit and a function to press the prism holder. Accordingly, it may be possible to reduce manufacturing cost by reducing the number of parts of the device and to improve the working efficiency in assembling the device.

Further, the laser light source device may further include a driving unit that includes a driving gear for rotating the prism holder and a driving motor connected to the driving gear, and the driving motor may be pressed toward the base member by a part of the mounting member. In this case, the mounting member may have a function to press the driving motor in addition to a function to hold the optical axis adjusting unit and a function to press the prism holder. Accordingly, it may be possible to reduce manufacturing cost by reducing the number of parts of the device and to improve the working efficiency in assembling the device.

Furthermore, according to another aspect of the invention, a laser light source device includes a prism that is disposed on a light path of laser light emitted from a light source, a prism holder that holds the prism, and a driving gear that rotates the prism holder. Holding pieces for elastically holding the prism are formed at the prism holder.

According to the laser light source device, holding pieces for elastically holding the prism are formed at the prism holder. Accordingly, even though variation occurs in the shape of the prism, it may be possible to hold the prism while absorbing the variation in the shape. As a result, it may be possible to dispose the prism at a predetermined position on the prism holder without the need for a complicated structure.

In the laser light source device, the prism holder may include a case in which the prism is disposed, and a holding member that includes the holding pieces and is mounted on the case. In this case, after the prism is disposed in the case, by a simple operation for mounting a holding member on the case, it may be possible to dispose the prism at a predetermined position of the prism holder while absorbing variation occurring in the shape of the prism itself.

Further, in the laser light source device, the holding member may include an elastic piece that pushes the prism toward the base member where the prism holder is rotatably supported. In this case, since the prism may be pushed toward the base member by the elastic piece, it may be possible to suppress the looseness of the prism that may be generated in the thrust direction of the rotational axis of the prism holder.

In particular, in the laser light source device, a pushing member for eliminating backlash of the prism holder in a rotational direction of the prism holder may be disposed at a part of the base member where the prism holder is supported. In this case, the pushing member for eliminating backlash in the rotational direction may be disposed near the prism holder to which a driving force is applied from the driving gear. Accordingly, for example, when the pushing member is disposed on one side of the prism opposite to the holding member, it may be possible to appropriately control the rotation of the prism holder by avoiding the generation of stress to be applied to the prism (stress that twists the prism).

Further, the laser light source device may further include a mounting member that is mounted on the base member with the prism and the prism holder interposed between the mounting member and the base member, and a pressing portion, which presses the elastic piece of the holding member toward the base member, may be provided at the mounting member. In this case, since the elastic piece of the holding member is pressed by the pressing portion of the mounting member, it may be possible to stabilize the pushing force of the elastic piece and to apply the pushing force to the prism. Accordingly, it may be possible to more effectively suppress the looseness of the prism that may be generated in the thrust direction of the rotational axis of the prism holder.

Furthermore, in the laser light source device, a driving motor connected to the driving gear may be pressed toward the base member by a part of the mounting member. In this case, the mounting member may have a function to press the elastic piece of the holding member and a function to press the driving motor. Accordingly, it may be possible to improve the working efficiency in assembling the device and to reduce manufacturing cost by reducing the number of parts of the device.

Further, according to the invention, the holding pieces, which elastically hold the prism, are formed at the prism holder. Accordingly, even though variation occurs in the shape of the prism, it may be possible to hold the prism while absorbing the variation in the shape. As a result, it may be possible to dispose the prism at a predetermined position on the prism holder without the need for a complicated structure.

BRIEF DESCRIPTION OF THE DRAWINGS

FIGS. 5A-5D are views showing the structure of a bracket of the laser light source device according to the embodiment.

DESCRIPTION OF EXEMPLARY EMBODIMENTS

Figure 1:
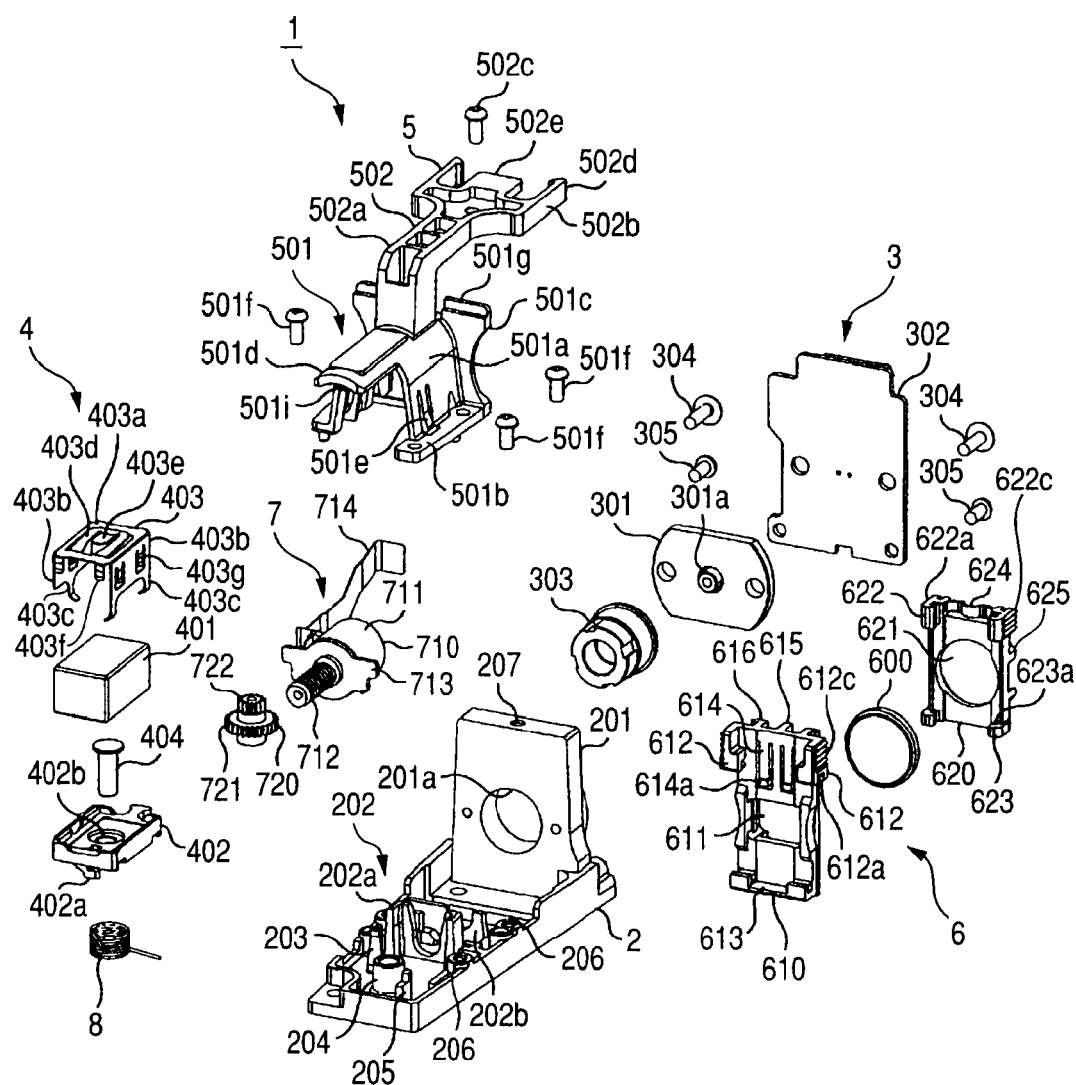
FIG. 1 is an exploded perspective view of a laser light source device according to an embodiment of the invention.
Figure 2:
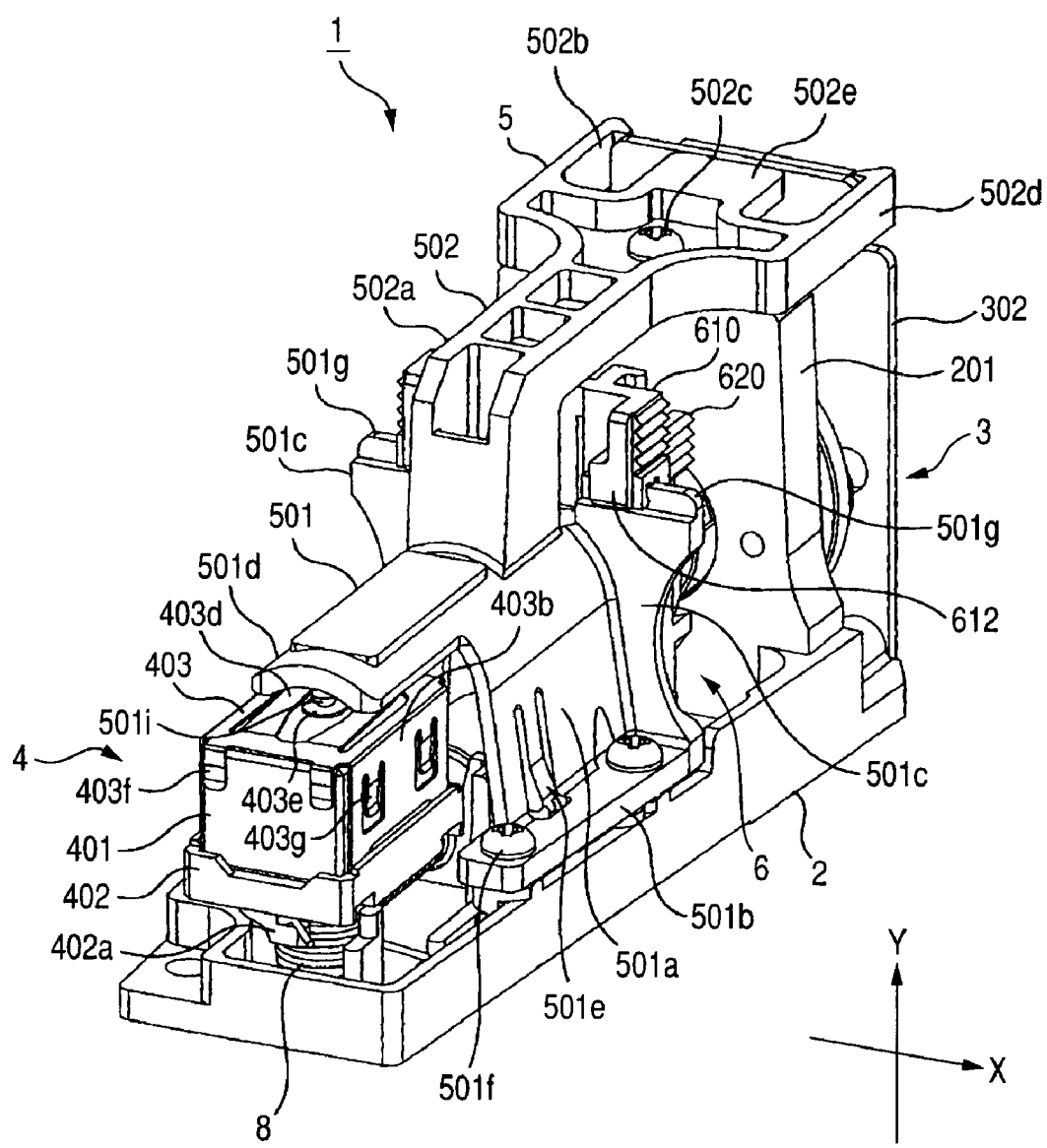
FIG. 2 is a perspective view of the assembled laser light source device according to the embodiment.
Figure 3:
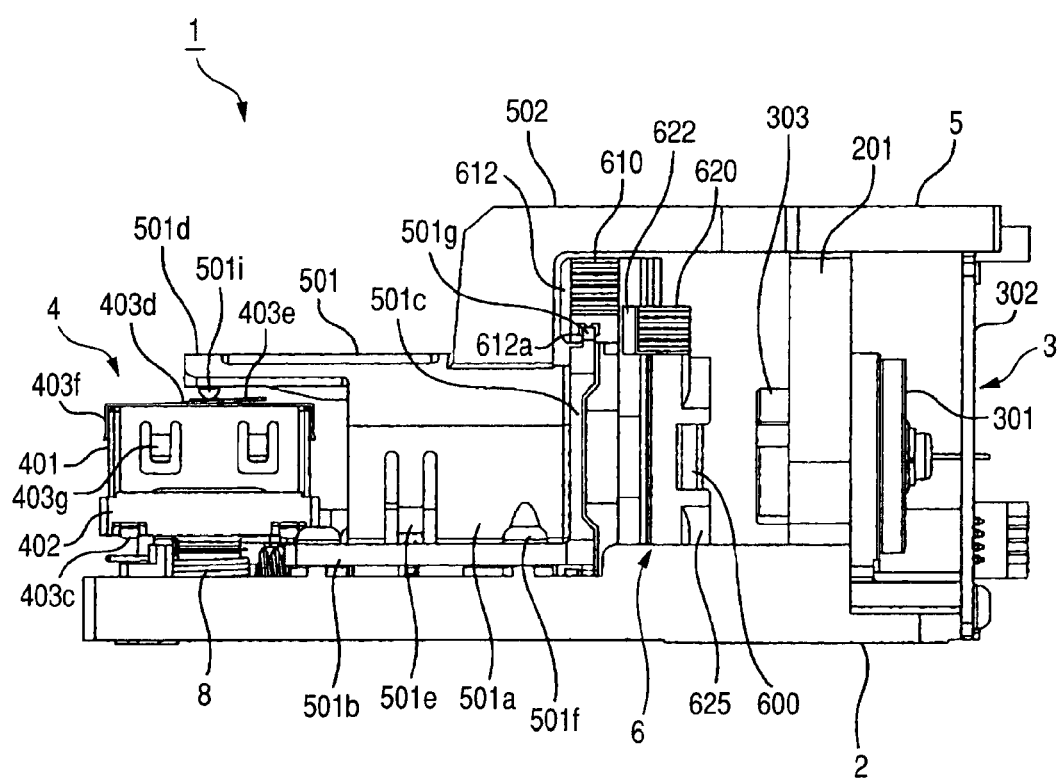
FIG. 3 is a side view of the assembled laser light source device according to the embodiment.

An embodiment of the invention will be described in detail below with reference to accompanying drawings. Meanwhile, a laser light source device according to this embodiment is applied to, for example, a light source device of a laser display system. FIG. 1 is an exploded perspective view of a laser light source device 1 according to an embodiment of the invention, FIG. 2 is a perspective view of the assembled laser light source device 1, and FIG. 3 is a side view of the assembled laser light source device 1. As shown in FIGS. 1 to 3, the laser light source device 1 according to this embodiment includes a base 2 as a base member, a light source unit 3 and a light source irradiation unit 4 that are mounted on the base 2, a bracket 5 as a mounting member that fixes the light source unit 3 and the light source irradiation unit 4, an optical axis adjusting unit 6 that is mounted on the bracket 5, and a driving unit 7 that drives the light source irradiation unit 4, as main components. Meanwhile, in the following description, for convenience of description, the side corresponding to the light source irradiation unit 4 is referred to as the front side of the laser light source device 1 and the side corresponding to the light source unit 3 is referred to as the rear side of the laser light source device 1.

The base 2 is made of, for example, an insulating resin material and forms the bottom portion of the laser light source device 1. A vertical support 201, which includes a holding hole 201a for holding a lens holder 303 to be described below, is provided at the rear end portion of the base 2. A motor holding part 202, which holds a driving motor 710 of the driving unit 7 to be described below, is provided on the front side of the vertical support 201, and a shaft portion 203, which supports a driving gear 720 of the driving unit 7 to be described below so as to allow the driving gear to rotate, is provided near the motor holding part 202. Further, a cylindrical portion 204 into which a fixed shaft 404 of the light source irradiation unit 4 to be described below is inserted is provided on the front side of the motor holding part 202. A locking piece 205, which locks one end of a torsion spring 8 wound around the cylindrical portion 204 during the assembly, is provided near the cylindrical portion 204.

The light source unit 3 includes a laser diode holder (light source support plate) 301 that holds a laser diode as a light source, a printed circuit board (hereinafter, referred to as a "circuit board") 302 that has at least a function as a power board for supplying power to the laser diode, and a cylindrical lens holder 303 that holds a collimator lens. The laser diode holder 301 is made of metal, which has an excellent thermal conductivity, so as to have a heat radiating function, and includes a laser light emitting opening 301a at the center thereof. The lens holder 303 is fitted to the holding hole 201a of the vertical support 201 that is a small-diameter portion disposed on the front side. The laser diode holder 301 and the circuit board 302 are fixed to the rear surface of the vertical support 201, which has held the lens holder 303, by screws 304. Further, the lower end portion of the circuit board 302 is fixed to the bottom portion of the base 2 by screws 305. In this way, the light source unit 3 is provided on the rear side of the vertical support 201 of the base 2 in this embodiment.

Figure 4A:
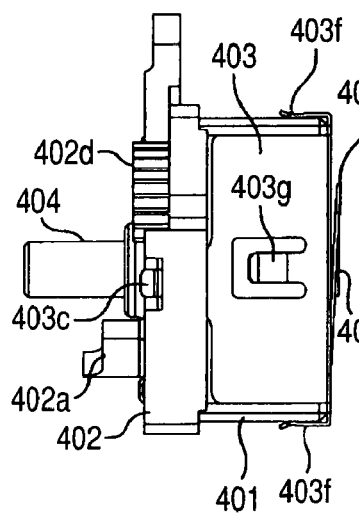
FIGS. 4A-4D are views showing an assembled light source irradiation unit of the laser light source device according to the embodiment.
Figure 4B:
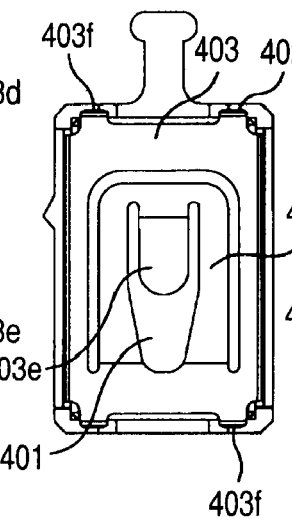
Figure 4C:
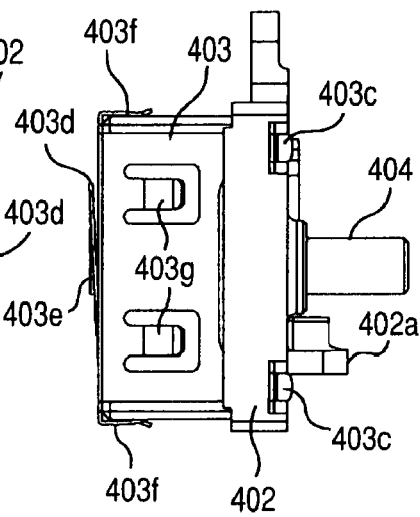
Figure 4D:
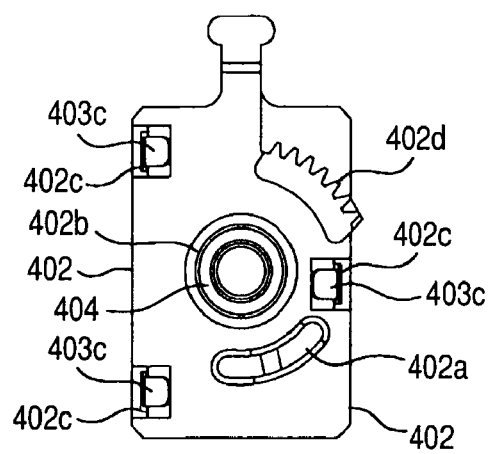

The light source irradiation unit 4 includes a rotatable prism 401, a case 402 that holds the lower end portion of the prism 401, a holding member 403 that covers the prism 401 from above and is mounted on the case 402, and a fixed shaft 404 that is inserted into the case 402. In this embodiment, a prism holder is formed of the case 402 and the holding member 403. The prism 401 regulates the emission direction of laser light emitted from the light source unit 3. The case 402 receives a driving force from the driving unit 7 and rotates the prism 401. A locking portion 402a, which locks one end of the torsion spring 8 wound around the cylindrical portion 204 of the base 2, is provided on the lower surface of the case 402. Further, a through hole 402b through which the fixed shaft 404 passes is formed at the center of the case 402. Furthermore, a plurality of slits 402c (not shown in FIG. 1, see FIG. 4D) into which engaging arms 403c of the holding member 403 to be described below are inserted is formed at the case 402 near the side surface portion of the case. In addition, a gear portion 402d (not shown in FIG. 1, see FIG. 4D), which meshes with a driving gear of the driving unit to be described below, is formed on the lower surface of the case 402.

The holding member 403 is formed by bending, for example, a thin metal plate. The holding member includes an upper surface portion 403a that presses the upper surface of the prism 401, side surface portions 403b that extend downward from side end portions of the upper surface portion 403a facing each other, and engaging arms 403c that extend downward from lower end portions of the side surface portions 403b. The upper surface portion 403a includes an elastic portion 403d that is formed by slightly bending a part thereof upward, a pressed portion 403e that is formed near the center of the elastic portion 403d and receives a pressing force from a pressing protrusion 501i of the bracket 5 to be described below, and holding pieces 403f that extend from front and rear end portions of the upper surface portion. Holding pieces 403g are formed at the side surface portions 403b by forming substantially U-shaped slits at a part of the side surface portions. The fixed shaft 404 passes through the through hole 402b of the case 402 and protrudes downward, and is fixed to the cylindrical portion 204 of the base 2 at the protruding portion thereof. Since the fixed shaft 404 is fixed to the cylindrical portion 204 as described above, the prism holder formed of the case 402 and the holding member 403 is rotatably supported by the base 2.

FIGS. 4A-4D are views showing the assembled light source irradiation unit 4 of the laser light source device 1 according to this embodiment. When the light source irradiation unit 4 is assembled, as shown in FIG. 4, the fixed shaft 404 passes through the through hole 402b of the case 402 and the prism 401 is then covered with the holding member 403 while being placed on the fixed shaft. In this case, the engaging arms 403c of the holding member 403 are inserted into the slits 402c that are formed at the case 402 near the side surface portion of the case, and the end portions of the engaging arms are bent inward, so that the prism 401 is fixed to the case 402. The holding pieces 403f and 403g of the holding member 403 elastically hold the front, rear, and side surfaces of the prism 401. The holding pieces 403f and 403g elastically hold the side surfaces of the prism 401 disposed on the case 402 as described above. Accordingly, even though variation occurs in the shape of the prism 401, it may be possible to hold the prism 401 while absorbing the variation in the shape and to fix the prism to a predetermined position on the case 402. Further, since the elastic portion 403d of the holding member 403 slightly floats from the upper surface of the prism 401, the pressed portion 403e is disposed substantially parallel to the upper surface of the prism at a position that is slightly separated from the upper surface of the prism 401. An elastic piece, which pushes the prism 401 against the base 2, is formed of the elastic portion 403d and the pressed portion 403e, so that the prism 401 may be reliably pushed against the base 2 by a pressing force applied from a pressing protrusion 501i of the bracket 5 to be described below.

The bracket 5 is made of, for example, an insulating resin material. The bracket generally includes a base portion 501 and an extension portion 502. The base portion 501 is fixed to the base 2 and receives a driving motor 710 of the driving unit 7 to be described below. The extension portion 502 extends from an upper end portion of the base portion 501, is fixed to the vertical support 201, and holds the upper end portion of the circuit board 302. As shown in more detail in FIGS. 5A-5D, the base portion 501 includes a receiving portion 501a, fixing portions 501b, a wall portion 501c, and a pressing portion 501d. The receiving portion 501a is opened downward and receives the driving motor 710 of the driving unit 7 to be described below. The fixing portions 501b laterally extend from the lower end portions of the receiving portion 501a. The wall portion 501c is formed at the rear end portion of the receiving portion 501a. The pressing portion 501d extends toward the front side from the middle of the front end portion of the receiving portion 501a.

Pressing portions 501e, which are elastically deformable and press a flange part 713 of the driving motor 710 to be described below, are formed at the side surfaces of the receiving portion 501a. The fixing portions 501b extend parallel to the bottom of the base 2, and are fixed to the fixing holes 206 of the base 2 by a plurality of screws 501f. Guide portions 501g and 501h, which guide an X-axis moving part 610 to be described below so as to allow the X-axis moving part to slide, are formed at the upper and lower end portions of the wall portion 501c (the guide portion 501h is not shown in FIG. 1, see FIG. 5C). Further, an opening (not shown) is formed at a portion of the wall portion 501c corresponding to an optical axis. The pressing portion 501d continues from the upper end portion of the receiving portion 501a. A pressing protrusion 501i, which presses the pressed portion 403e of the holding member 403 of the light source irradiation unit 4, is formed on the lower surface of the pressing portion. In addition, pressing portions 501j, which press the surface of a motor main body 711 of the driving motor 710 to be described below against the base 2, are formed on the inner wall surface of the receiving portion 501a.

The extension portion 502 includes an arm portion 502a and a holding portion 502b. The arm portion 502a extends upward from the rear end portion of the upper end portion of the base portion 501 and extends backward. The holding portion 502b is formed at the rear end portion of the arm portion 502a and holds the upper end portion of the circuit board 302. The arm portion 502a has a substantially L-shape in side view, and a portion of the arm portion connected to the holding portion 502b is fixed to a fixing hole 207, which is formed at the upper surface portion of the vertical support 201, by a screw 502c. The holding portion 502b includes a pair of claw portions 502d and a contact portion 502e. The pair of claw portions 502d extends from side portions of the rear end portion of the arm portion 502a, and the contact portion 502e comes into contact with the front surface of the circuit board 302. The holding portion 502b holds the circuit board 302 by locking the rear surface of the upper end portion of the circuit board 302 with the claw portions 502d so that the contact portion 502e comes into contact with the front surface of the circuit board 302.

The optical axis adjusting unit 6 includes a concave lens 600 that adjusts the optical axis of laser light that is emitted from a laser diode, and an adjustment mechanism that adjusts the positions of the concave lens 600 in X and Y directions. In the laser light source device 1 according to this embodiment, a plane perpendicular to the optical axis is referred to as an X-Y plane, and directions, which are orthogonal to each other in the X-Y plane, are referred to as an X-axis direction and a Y-axis direction (see FIG. 2). The above-mentioned adjustment mechanism includes the X-axis moving part 610 that is movable in the X-axis direction, and a Y-axis moving part 620 that is moved together with the X-axis moving part 610 as a single body and is movable in the Y-axis direction. The adjustment mechanism adjusts the positions of the concave lens 600 in the X- and Y-axis directions by the X-axis moving part 610 and the Y-axis moving part 620.

Figure 6B:
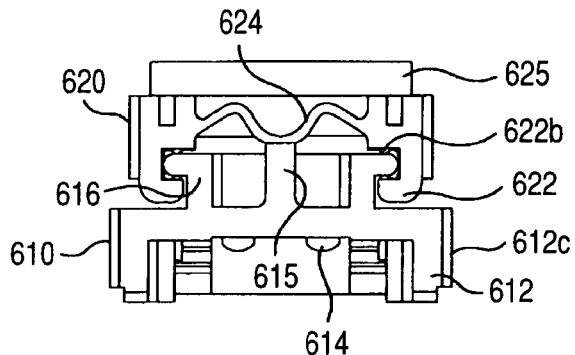
FIGS. 6A-6E are views showing the structure of an optical axis adjusting unit of the laser light source device according to the embodiment.
Figure 6A:
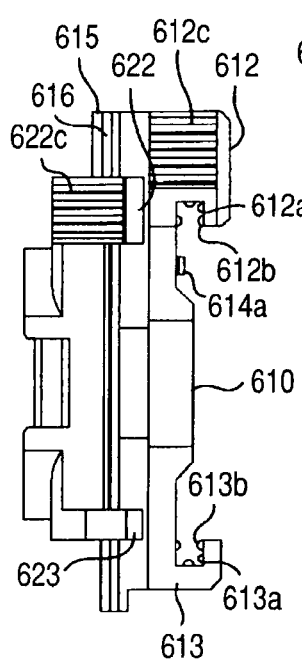
Figure 6C:
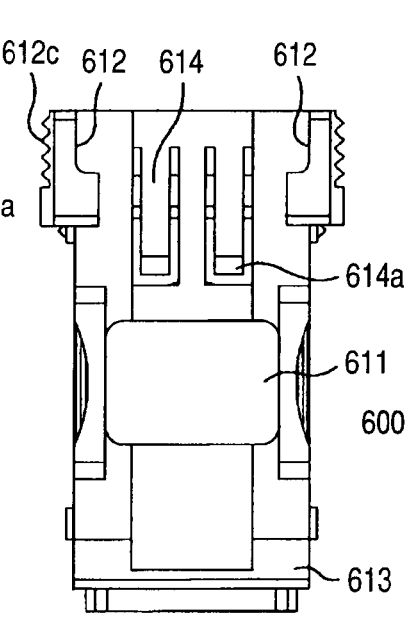
Figure 6E:
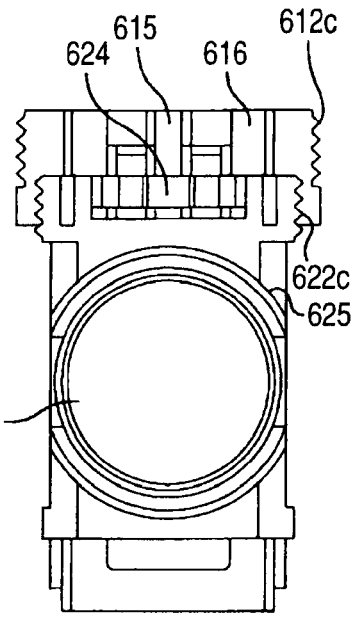

The X-axis moving part 610 is made of, for example, an insulating resin material, is formed substantially in the shape of a flat plate, and includes a rectangular opening 611 at the center thereof. A pair of engaging pieces 612, which protrudes toward the front side, is formed on the side portions of the front surface of the X-axis moving part 610 near the upper end portion of the X-axis moving part. These engaging pieces 612 are engaged with the guide portion 501g of the bracket 5. Grooves 612a, which are opened downward, are formed at the lower end portions of these engaging pieces 612, and a plurality of protrusions 612b is formed on the inner walls of the grooves 612a (the protrusions 612b are not shown in FIG. 1, see FIG. 6A). The grooves 612a are portions that are guided by the guide portion 501g of the bracket 5 during the sliding of the X-axis moving part 610. The protrusions 612b are portions that come into sliding contact with the surface of the guide portion 501g during the sliding of the X-axis moving part. Further, grip portions 612c having an uneven shape are formed on the outer side surfaces of the engaging pieces 612. The grip portions 612c are portions that are used for an operator to move the X-axis moving part 610 for the adjustment of the position of the concave lens 600.

Meanwhile, an engaging wall portion 613, which protrudes toward the front side, is formed at the lower end portion of the front surface of the X-axis moving part 610. The engaging wall portion 613 is engaged with the guide portion 501h of the bracket 5. The side end portions of the engaging wall portion 613 are thicker than the middle portion of the engaging wall portion, and grooves 613a, which are opened upward, are formed at the thick portions. Like in the grooves 612a, a plurality of protrusions 613b is formed on the inner walls of the grooves 613a (the protrusions 613b are not shown in FIG. 1, see FIG. 6A). The grooves 613a are portions that are guided by the guide portion 501h of the bracket 5 during the sliding of the X-axis moving part 610. The protrusions 613b are portions that come into sliding contact with the surface of the guide portion 501h during the sliding of the X-axis moving part. The X-axis moving part 610 is mounted on the guide portions 501g and 501h of the bracket 5 by the engaging pieces 612 and the engaging wall portion 613, and is slidable in the X-axis direction.

Further, as X-axis adjusting means, a pair of elastically deformable elastic contact pieces 614 is provided between the pair of engaging pieces 612. These elastic contact pieces 614 are formed by forming substantially U-shaped slits at a plate-shaped portion of the X-axis moving part 610. Accordingly, upper end portions of the elastic contact pieces are fixed and lower end portions thereof are formed so as to be elastically deformable as free ends. Protruding pieces 614a, which protrude toward the front side, are formed at the lower end portions of the elastic contact pieces 614. When the X-axis moving part 610 is mounted on the bracket 5, the elastic contact pieces 614 regulate the movement of the X-axis moving part 610 by making the protruding pieces 614a come into elastic contact with the rear surface of the wall portion 501c. That is, the elastic contact pieces 614 function to adjust the position of the concave lens 600 in the X-axis direction by coming into elastic contact with a part of the bracket 5 so as to lock the X-axis moving part 610.

In addition, a protruding piece 615, which protrudes toward the rear side, is formed at the upper end portion of the rear surface of the X-axis moving part 610. The protruding piece 615 extends in a vertical direction in the middle of the X-axis moving part 610, and is disposed at a position where an elastic contact piece 624 of the Y-axis moving part 620 to be described below may come into elastic contact with the protruding piece. A pair of guide portions 616, which extends in the vertical direction, is formed on both sides of the protruding piece 615. These guide portions 616 protrude from the rear surface of the X-axis moving part 610 toward the rear side, extend toward the both sides at the rear ends thereof, and guide the Y-axis moving part 620 in the vertical direction so as to allow the Y-axis moving part to slide.

The Y-axis moving part 620 is made of, for example, an insulating resin material, is formed substantially in the shape of a flat plate, and includes a circular opening 621 at the center thereof. A pair of engaging pieces 622, which protrudes toward the front side, is formed on the side portions of the front surface of the Y-axis moving part 620 near the upper end portion of the Y-axis moving part. These engaging pieces 622 are engaged with the guide portions 616 of the X-axis moving part 610. Grooves 622a, which are opened so as to face each other, are formed on the inner wall portions, which face each other, of the engaging pieces 622, and a plurality of protrusions 622b is formed on the inner walls of the grooves 622a (the protrusions 622b are not shown in FIG. 1, see FIG. 6B). The grooves 622a are portions that are guided by the guide portions 616 of the X-axis moving part 610 during the sliding of the Y-axis moving part 620. The protrusions 622b are portions that come into sliding contact with the surfaces of the guide portions 616 during the sliding of the Y-axis moving part. Further, grip portions 622c having an uneven shape are formed on the outer side surfaces of the engaging pieces 622. The grip portions 622c are portions that are used for an operator to move the Y-axis moving part 620 for the adjustment of the position of the concave lens 600.

Figure 6D:
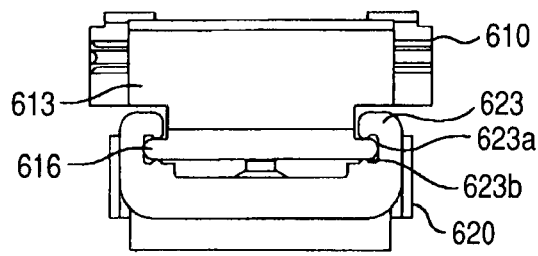

Meanwhile, a pair of engaging pieces 623, which protrudes toward the front side, is formed on the side portions of the front surface of the Y-axis moving part 620 near the lower end portion of the Y-axis moving part. These engaging pieces 623 are engaged with the guide portions 616 of the X-axis moving part 610, like the engaging pieces 622. Grooves 623a, which are opened so as to face each other, are formed on the inner wall portions, which face each other, of the engaging pieces 623, and a plurality of protrusions 623b is formed on the inner walls of the grooves 623a (the protrusions 623b are not shown in FIG. 1, see FIG. 6D). The grooves 623a are portions that are guided by the guide portions 616 of the X-axis moving part 610 during the sliding of the Y-axis moving part 620. The protrusions 623b are portions that come into sliding contact with the surfaces of the guide portions 616 during the sliding of the Y-axis moving part. The Y-axis moving part 620 is mounted on the guide portions 616 of the X-axis moving part 610 by the engaging pieces 622 and 623, and is movable in the Y-axis direction.

Further, as Y-axis adjusting means, an elastically deformable elastic contact piece 624 is provided between the pair of engaging pieces 622. The elastic contact piece 624 is formed in a corrugated shape in a horizontal direction of the Y-axis moving part 620. Accordingly, the elastic contact piece is formed so as to come into elastic contact with the protruding piece 615 of the X-axis moving part 610. In other words, the elastic contact piece 624 is formed of an elastic member that includes a contact portion and a curved portion. The contact portion comes into contact with a part (protruding piece 615) of the X-axis moving part 610, and the curved portion continues from the contact portion. Accordingly, the elastic contact piece is formed so as to come into elastic contact with the X-axis moving part 610. When the Y-axis moving part 620 is mounted on the X-axis moving part 610, the elastic contact piece 624 comes into elastic contact with the rear end portion of the protruding piece 615 so as to regulate the movement of the Y-axis moving part 620. That is, the elastic contact piece 624 functions to adjust the position of the concave lens 600 in the Y-axis direction by coming into elastic contact with a part of the X-axis moving part 610 and locking the Y-axis moving part 620. In addition, a circular-arc shaped lens holding portion 625, which can hold the concave lens 600, is formed on the rear surface of the Y-axis moving part 620. For example, the concave lens 600 is press-fitted to the lens holding portion 625 and is bonded and fixed to the lens holding portion by an adhesive or the like.

FIGS. 6A-6E are views showing the assembled optical axis adjusting unit 6 of the laser light source device 1 according to this embodiment. As shown in FIGS. 6A-6E, the Y-axis moving part 620 is slidably mounted on the guide portions 616 of the X-axis moving part 610. Further, the X-axis moving part 610 is slidably mounted on the guide portion 501g of the bracket 5 (not shown). In this case, the Y-axis moving part 620 is mounted so that the elastic contact piece 624 comes into elastic contact with the protruding piece 615 of the X-axis moving part 610. The X-axis moving part 610 is mounted so that the elastic contact pieces 614 come into elastic contact with the wall portion 501c of the bracket 5. Accordingly, the Y-axis moving part 620 is held while being stopped at the current position with respect to the X-axis moving part 610, and the X-axis moving part 610 is held while being stopped at the current position with respect to the bracket 5. Therefore, an operator who adjusts the positions of the concave lens 600 can easily adjust the positions of the concave lens 600 by manually making the X-axis moving part 610 and the Y-axis moving part 620 slide.

Since the elastic contact pieces 614 and the elastic contact piece 624, which can adjust the positions of the concave lens 600 and lock the positions of the X-axis moving part 610 and the Y-axis moving part 620, are formed on the X-axis moving part 610 and the Y-axis moving part 620 as described above, it may be possible to adjust the positions of the concave lens 600 by the X-axis moving part 610 and the Y-axis moving part 620 and to hold the concave lens 600 of which the positions have been adjusted. Further, it may be possible to stabilize the moving paths of the X-axis moving part 610 and the Y-axis moving part 620 by making the X-axis moving part 610 and the Y-axis moving part 620 slide along the guide portion 501g of the bracket 5 and the guide portions 616 of the X-axis moving part 610. Accordingly, it is easy to specify the elastic contact positions with which the elastic contact pieces 614 and the elastic contact piece 624 come into elastic contact, and to appropriately lock the X-axis moving part 610 and the Y-axis moving part 620 to the bracket 5 and the X-axis moving part 610. In particular, the elastic contact piece 624 is made of an elastic member having a corrugated shape, that is, is formed of an elastic contact member that includes the contact portion coming into contact with a part of the X-axis moving part 610 and the curved portion continuing from the contact portion. It may be possible to lock the Y-axis moving part 620 to the X-axis moving part 610 with simple structure by making the elastic contact piece come into elastic contact with the protruding piece 615 of the X-axis moving part 610. Meanwhile, the shape of the elastic contact piece 624 is not limited to the corrugated shape.

The driving unit 7 includes a driving motor 710 that supplies a driving force for rotating the light source irradiation unit 4, and a driving gear 720 that transmits the driving force of the driving motor 710 to the case 402. The driving motor 710 includes a motor main body 711, a driving shaft 712 that protrudes from the motor main body 711 toward the front side, a flange part 713 that is provided on the driving shaft 712 near the driving motor 710, and a flat cable 714 that is used to supply an electrical signal to the motor main body 703. The driving motor 710 is mounted on the base 2 so that the flange part 713 is disposed between a pair of substantially U-shaped holding pieces 202a and 202b forming the motor holding part 202 and the driving shaft 712 is rotatably held. A groove, which meshes with a first gear portion 721 of the driving gear 720 to be described below, is formed on the surface of the driving shaft 712. The flat cable 714 is led toward the rear side and connected to a terminal portion that is formed on the rear surface of the circuit board 302.

The driving gear 720 includes a first gear portion 721 and a second gear portion 722 of which the diameter is smaller than the diameter of the first gear portion 721. The driving gear is mounted on the base 2 so that the shaft portion 203 is inserted into the driving gear. In this case, the driving gear 720 is mounted at a position where the first gear portion 721 meshes with the driving shaft 712 and the second gear portion 722 meshes with the gear portion 402d of the case 402. When an electrical signal is supplied to the driving motor 710 and the driving shaft 712 is rotated, the first gear portion 721 is rotated with the rotation of the driving shaft and the case 402 is rotated in accordance with the rotation of the second gear portion 722 that is formed integrally with the first gear portion 721. Accordingly, it may be possible to rotate the prism 401.

Figure 7:
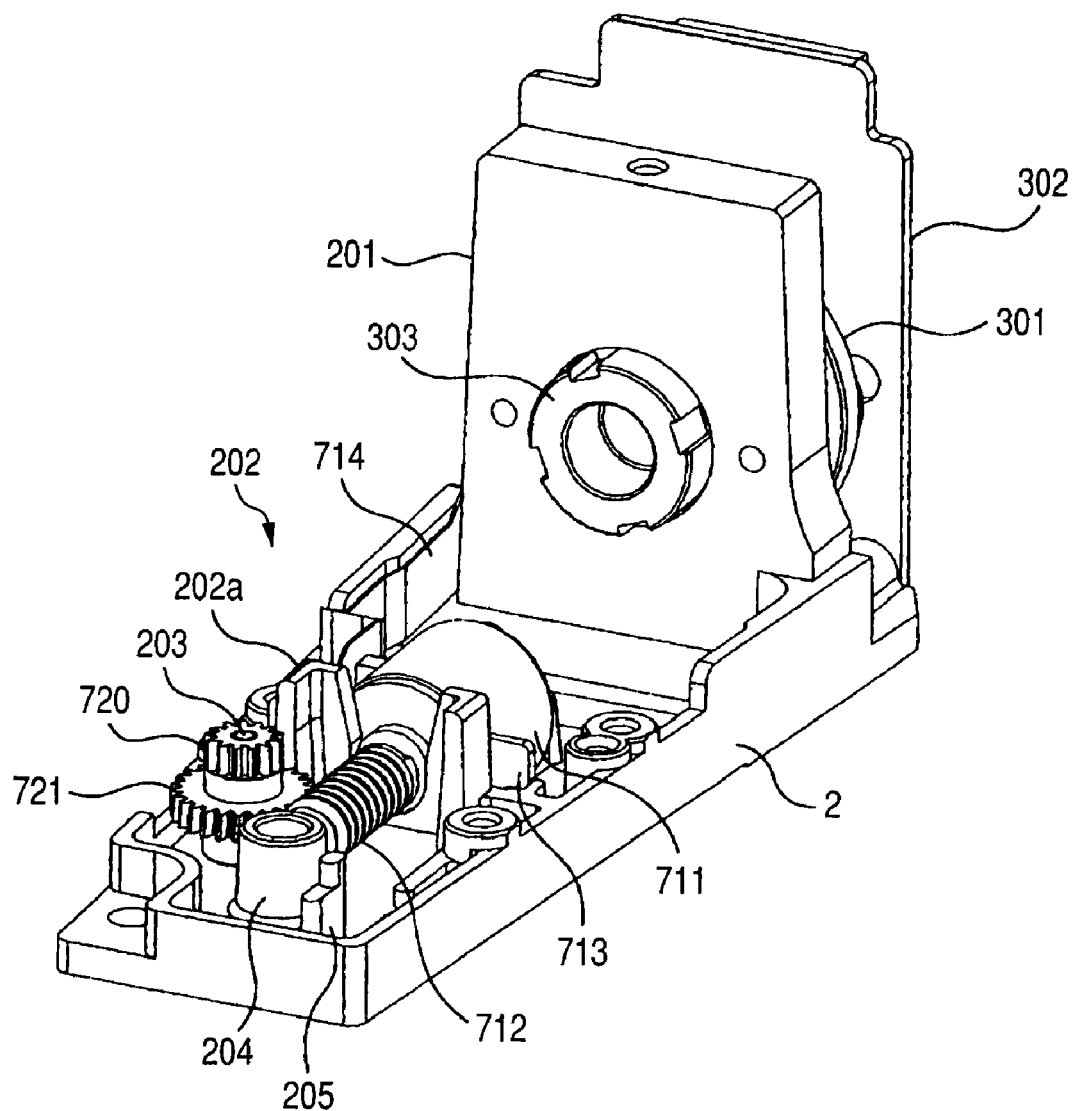
FIG. 7 is a view illustrating a process for assembling the laser light source device according to the embodiment.
Figure 8:
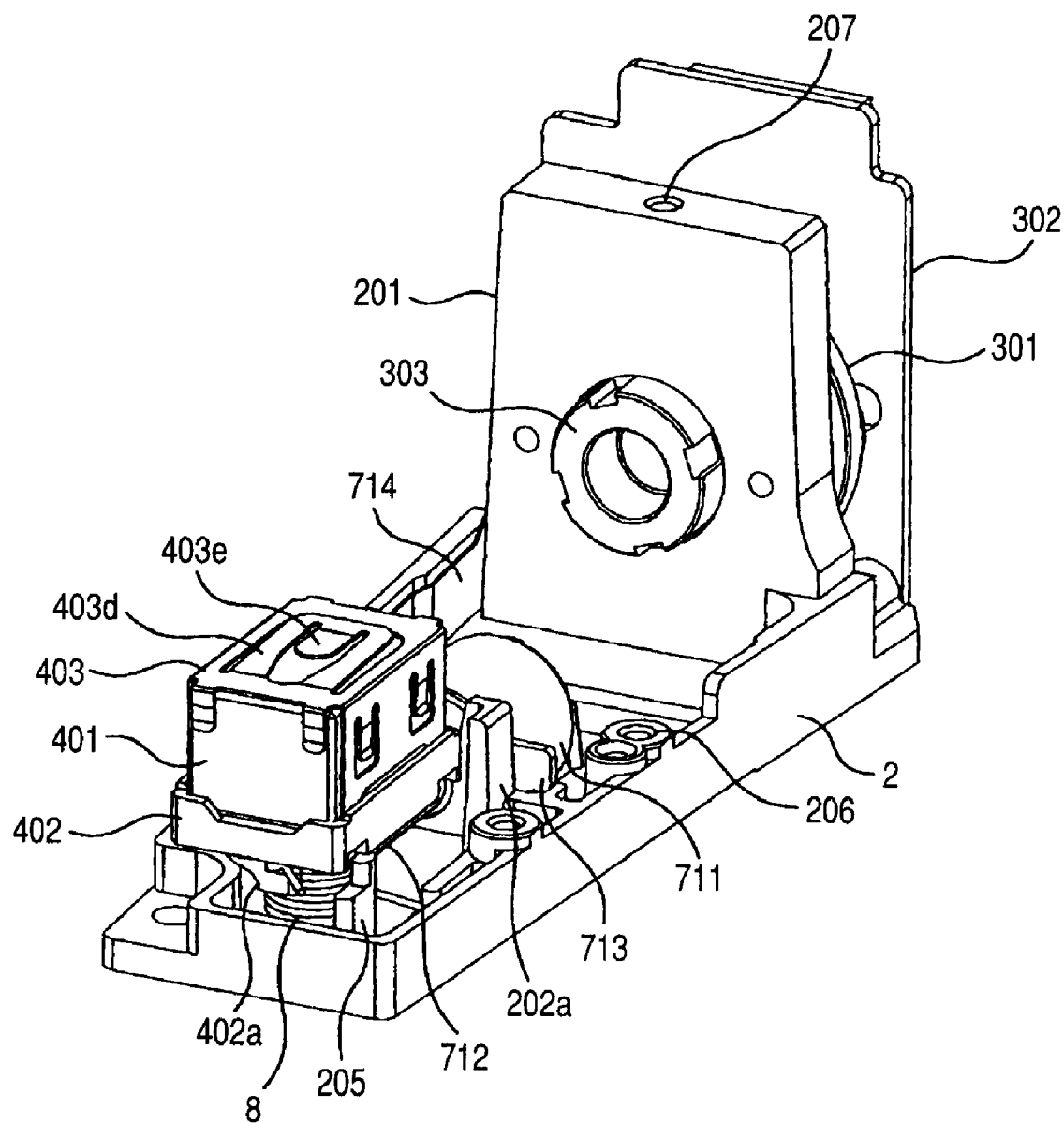
FIG. 8 is a view illustrating the process for assembling the laser light source device according to the embodiment.

A process for assembling the laser light source device 1 having the above-mentioned structure will be described here. FIGS. 7 and 8 are perspective views illustrating a process for assembling the laser light source device 1 according to this embodiment. When the laser light source device 1 according to this embodiment is assembled, first of all, the lens holder 303 is fitted to the holding hole 201a of the vertical support 201 of the base 2. Further, the circuit board 302 is fixed to the rear surface of the vertical support 201, to which the lens holder 303 has been fitted, by the screws 304 and 305 so that the laser diode holder 301 is disposed between the circuit board and the vertical support.

After that, the driving motor 710 is disposed on the motor holding part 202 of the base 2 so that the flange part 713 is disposed between the holding pieces 202a and 202b and the driving shaft 712 is rotatably held. Further, the flat cable 714 connected to the motor main body 711 is connected to the terminal portion of the circuit board 302. Furthermore, the driving gear 720 is mounted on the shaft portion 203 so that the first gear portion 721 meshes with the gear groove of the driving shaft 702. When the light source unit 3 and the driving unit 7 are mounted on the base 2 as described above, the laser light source device 1 shown in FIG. 7 is obtained. Meanwhile, the order of an operation for fixing the circuit board 302 to the base 2 and an operation for mounting the driving motor 710 on the base 2 may be changed.

Subsequently, the torsion spring 8 is disposed around the cylindrical portion 204 of the base 2, and the light source irradiation unit 4 is mounted on the cylindrical portion so that the fixed shaft 404 is inserted into the cylindrical portion 204. One end of the torsion spring 8 is locked to the locking portion 402a of the case 402, so that the torsion spring applies a constant pushing force. Accordingly, the torsion spring functions to eliminate the backlash of the case 402 in the rotational direction. However, if an operation for mounting the light source irradiation unit 4 and an operation for locking one end of the torsion spring 8 to the locking portion 402a are performed at the same time, it is necessary to perform a troublesome operation such as an operation for mounting the light source irradiation unit 4 while holding one end of the torsion spring 8 by hand. For this reason, if one end of the torsion spring 8 is released after the light source irradiation unit 4 is mounted while one end of the torsion spring 8 is locked to the locking piece 205 of the base 2 in the laser light source device 1 according to this embodiment, the one end of the torsion spring is locked to the locking portion 402a of the case 402. In this case, since it may be possible to separately perform the operation for mounting the light source irradiation unit 4 and the operation for locking one end of the torsion spring 8 to the locking portion 402a, it may be possible to improve the working efficiency in assembling the light source irradiation unit 4. When the light source irradiation unit 4 is mounted on the base 2 as described above, the laser light source device 1 shown in FIG. 8 is obtained.

The case 402 that receives a driving force from the driving unit 7, and the torsion spring 8 of which one end is locked to the case 402 and which eliminates the backlash of the case 402 in the rotational direction are disposed below the prism 401 in the laser light source device 1 according to this embodiment as shown in FIG. 8. Accordingly, for example, when the torsion spring 8 is disposed on one side (upper side) of the prism 401 opposite to the holding member 403, it may be possible to appropriately control the rotation of the case 402 by avoiding the generation of stress which is applied to the prism 401 (stress that twists the prism 401).

Next, the bracket 5 on which the optical axis adjusting unit 6 has been mounted is mounted on the base 2 from the upper side of the laser light source device 1 shown in FIG. 8. When the bracket 5 is mounted, the driving motor 710 is received in the receiving portion 501a of the base portion 501, the fixing portions 501b of the base portion 501 is fixed to the fixing hole 206 of the base 2 by the screws 501f, and the holding portion 502b of the extension portion 502 is fixed to the fixing hole 207 of the vertical support 201 by the screw 502c. The bracket 5 on which the optical axis adjusting unit 6 has been mounted as described above is mounted on the base 2, so that the laser light source device 1 shown in FIG. 2 is obtained. In this embodiment, the bracket 5 on which the optical axis adjusting unit 6 has been mounted is mounted on the base 2, so that the working efficiency in assembling the light source device 1 is improved without performing an operation for directly mounting the optical axis adjusting unit 6, which includes an adjustment mechanism movable in the X- and Y-axis directions, on the base 2.

When the bracket 5 is mounted on the base 2 as described above, the pressed portion 403e of the holding member 403 of the light source irradiation unit 4 is pressed by the pressing protrusion 501i of the pressing portion 501d of the base portion 501. Accordingly, since the prism 401 is pushed toward the base 2 by the elastic portion 403d of the holding member 403, it may be possible to suppress the looseness of the prism 401 that may be generated in the thrust direction of the rotational axis of the prism holder. Further, the rear surface of the upper end portion of the circuit board 302 is held by the pair of claw portions 502d of the holding portion 502b of the extension portion 502. Accordingly, the upper end portion of the circuit board 3 fixed to the base 2 is held, and the base 2 and the bracket 5 are formed integrally with each other. In addition, the driving motor 710 is pressed toward the base 2 by the pressing portions 501j that are formed on the inner wall surface of the receiving portion 501a of the base portion 501. Therefore, it may be possible to press the driving motor 710 simply by mounting the bracket 5 on the base 2 without separately requiring the structure for pressing (positioning) the driving motor 710 toward the base 2. If the bracket 5 has a plurality of functions, such as a function to press the pressed portion 401 and a function to press the driving motor 710, it may be possible to reduce manufacturing cost by reducing the number of parts of the device and to improve the working efficiency in assembling the device.

After the laser light source device is assembled as shown in FIG. 2, in the laser light source device 1 according to this embodiment, the positioning of the concave lens 600 is performed by making the X-axis moving part 610 and the Y-axis moving part 620 of the optical axis adjusting unit 6 slide by hand and the adjustment of an angle of the prism 401 is performed by rotating the light source irradiation unit 4 by the driving unit 7. Further, the X-axis moving part 610 and the Y-axis moving part 620 of the optical axis adjusting unit 6 are fixed by an adhesive or the like. Accordingly, it may be possible to reliably hold the optical axis after the adjustment and the laser light source device 1 is completed.

In the laser light source device 1 that is assembled as described above, laser light emitted from the laser diode, which is held at the laser diode holder 301 of the light source unit 3, is emitted through the laser light emitting opening 301a and passes through the collimator lens that is held at the lens holder 303. Then, the laser light passes through the concave lens 600 of the optical axis adjusting unit 6, travels in a direction that is regulated by the prism 401 of the light source irradiation unit 4, and is guided to, for example, a display screen of a laser display system.

The elastic contact pieces 614 and the elastic contact piece 624, which can adjust the positions of the concave lens 600 and lock the positions of the X-axis moving part 610 and the Y-axis moving part 620, are formed on the Y-axis moving part 620 and the X-axis moving part 610 including the optical axis adjusting unit 6, which adjusts the optical axis of the laser light emitted from the light source unit 3, in the laser light source device 1 according to this embodiment as described above. Accordingly, it may be possible to adjust the positions of the concave lens 600 by the X-axis moving part 610 and the Y-axis moving part 620 and to hold the concave lens 600 of which the positions have been adjusted. As a result, it may be possible to adjust the optical axis without the need for a complicated structure.

In addition, in the laser light source device 1 according to this embodiment, the holding pieces 403f and 403g, which elastically hold the prism 401, are formed at the prism holder of the light source irradiation unit 4. Accordingly, even though variation occurs in the shape of the prism 401, it may be possible to hold the prism 401 while absorbing the variation in the shape. As a result, it may be possible to dispose the prism 401 at a predetermined position on the prism holder without the need for a complicated operation for fixing the prism 401 to the prism holder by an adhesive or the like as in the related art. In particular, the prism holder includes the case 402 on which the prism 401 is disposed, and the holding member 403 that includes holding pieces 403f and 403g and is mounted on the case 402. Accordingly, after the prism 401 is disposed on the case 402, by a simple operation for mounting the holding member 403 on the case 402, it may be possible to dispose the prism 401 at a predetermined position on the prism holder while absorbing the variation occurring in the shape of the prism 401.

Meanwhile, the invention is not limited to the above-mentioned embodiment, and may have various modifications. The size, shape, and the like shown in the accompanying drawings of the embodiment may be appropriately modified without being limited to those of the embodiment in a range where the effect of the invention is exerted. Others of the invention may be appropriately modified without departing from the scope of the invention.

For example, in the above-mentioned embodiment, there has been described a case where the prism 401 is pushed toward the base 2 by the elastic portion 403d of the holding member 403 when the pressed portion 403e of the holding member 403 is pressed by the pressing protrusion 501i of the bracket 5. The structure for pushing the prism 401 is not limited thereto, and may be appropriately modified. The pressed portion 403e is not necessarily pressed by the pressing protrusion 501i of the bracket 5, and the prism 401 may be pushed toward the base 2 using only the elastic force of the elastic portion 403d of the holding member 403. Even in this case, it may be possible to obtain an advantage of suppressing the looseness of the prism 401 that may be generated in the thrust direction of the rotational axis of the prism holder.

It should be understood by those skilled in the art that various modifications, combinations, sub-combinations and alterations may occur depending on design requirements and other factors insofar as they are within the scope of the appended claims of the equivalents thereof.

What is claimed is:

1. A laser light source device comprising:
a light source unit that emits laser light;
an optical axis adjusting unit that adjusts an optical axis of the laser light emitted from the light source unit; and
a mounting member on which the optical axis adjusting unit is mounted,
wherein the optical axis adjusting unit includes an adjustment mechanism for adjusting the positions of a lens, which is disposed on a light path, in X- and Y-axis directions that are orthogonal to each other in a plane orthogonal to the optical axis, and the adjustment mechanism includes
- an X-axis moving part that is movable in the X-axis direction,
- a Y-axis moving part that is moved together with the X-axis moving part as a single body and is movable in the Y-axis direction,
- X-axis adjusting means that is provided at the X-axis moving part and adjusts the position of the lens in the X-axis direction by coming into elastic contact with a part of the mounting member so as to lock the X-axis moving part, and
- Y-axis adjusting means that is provided at the Y-axis moving part and adjusts the position of the lens in the Y-axis direction by coming into elastic contact with a part of the X-axis moving part so as to lock the Y-axis moving part.

2. The laser light source device according to claim 1, wherein the X-axis moving part is moved along a guide portion that is formed at the mounting member, and the Y-axis moving part is moved along guide portions that are formed at the X-axis moving part.

3. The laser light source device according to claim 1, wherein in the Y-axis adjusting means, the Y-axis moving part includes an elastic contact member that is formed of a contact portion coming into contact with a part of the X-axis moving part and a curved portion continuing from the contact portion, and comes into elastic contact with a protruding piece of the X-axis moving part that protrudes toward the Y-axis moving part.

4. The laser light source device according to claim 1, wherein after the positions of the lens are adjusted by the X-axis adjusting means and the Y-axis adjusting means, the X-axis moving part is bonded and fixed to the mounting member and the Y-axis moving part is bonded and fixed to the X-axis moving part.

5. The laser light source device according to claim 1, wherein the mounting member on which the optical axis adjusting unit has been mounted is mounted on a base member to which the light source unit is fixed.

6. The laser light source device according to claim 5, further comprising:
- a light source irradiation unit that includes a prism disposed on a light path of the laser light passing through the optical axis adjusting unit and a prism holder for holding the prism,
- wherein the prism holder is pressed toward the base member by a part of the mounting member.

7. The laser light source device according to claim 6, further comprising:
- a driving unit that includes a driving gear for rotating the prism holder and a driving motor connected to the driving gear,
- wherein the driving motor is pressed toward the base member by a part of the mounting member.

8. A laser light source device comprising:
- a prism that is disposed on a light path of laser light emitted from a light source;
- a prism holder that holds the prism, the prism holder including:
  - a case in which the prism is disposed; and
  - a holding member mounted on the case, the holding member including holding pieces that elastically hold the prism; and
- a driving gear that rotates the prism holder,
- wherein the holding member further includes an elastic piece that pushes the prism toward a base member where the prism holder is rotatably supported.

9. The laser light source device according to claim 8, wherein a pushing member for eliminating backlash of the prism holder in a rotational direction of the prism holder is disposed at a part of the base member where the prism holder is supported.

10. The laser light source device according to claim 8, further comprising:
- a mounting member that is mounted on the base member with the prism and the prism holder interposed between the mounting member and the base member,
- wherein a pressing portion, which presses the elastic piece of the holding member toward the base member, is provided at the mounting member.

11. The laser light source device according to claim 10, wherein a driving motor connected to the driving gear is pressed toward the base member by a part of the mounting member.

* * * * *